US008364483B2

(12) United States Patent
Park et al.

(10) Patent No.: US 8,364,483 B2
(45) Date of Patent: Jan. 29, 2013

(54) METHOD FOR SEPARATING SOURCE SIGNALS AND APPARATUS THEREOF

(75) Inventors: Ki-young Park, Daejeon (KR); Ho-Young Jung, Daejeon (KR); Yun Keun Lee, Daejeon (KR); Jeon Gue Park, Daejeon (KR); Jeom Ja Kang, Daejeon (KR); Hoon Chung, Daejeon (KR); Sung Joo Lee, Daejeon (KR); Byung Ok Kang, Daejeon (KR); Ji Hyun Wang, Daejeon (KR); Eui Sok Chung, Daejeon (KR); Hyung-Bae Jeon, Daejeon (KR); Jong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 840 days.

(21) Appl. No.: 12/488,215

(22) Filed: Jun. 19, 2009

(65) Prior Publication Data

US 2010/0158271 A1 Jun. 24, 2010

(30) Foreign Application Priority Data

Dec. 22, 2008 (KR) ........................ 10-2008-0131761

(51) Int. Cl.
*G10L 15/06* (2006.01)
*G10L 15/00* (2006.01)
*G10L 15/20* (2006.01)
*H04B 15/00* (2006.01)

(52) U.S. Cl. ....... 704/245; 704/231; 704/233; 381/94.1; 381/94.2; 381/94.3; 381/94.7

(58) Field of Classification Search ................. 381/94.1, 381/94.2, 94.3, 94.7; 704/233, 242, 243, 704/278, 231, 245
See application file for complete search history.

(56) References Cited

U.S. PATENT DOCUMENTS

| | | | | |
|---|---|---|---|---|
| 7,383,178 | B2 | 6/2008 | Visser et al. | |
| 2006/0056647 | A1 | 3/2006 | Ramakrishnan et al. | |
| 2008/0215651 | A1 * | 9/2008 | Sawada et al. | 708/205 |

FOREIGN PATENT DOCUMENTS

| | | |
|---|---|---|
| KR | 10-2008-0019879 | 3/2008 |
| KR | 10-2008-0061212 | 7/2008 |
| WO | 2007/100330 | 9/2007 |

OTHER PUBLICATIONS

"An Information-Maximization Approach to Blind Separation and Blind Deconvolution", Anthony J. Bell et al., Neural Computation, vol. 7 No. 6, pp. 1129-1159, 1995.

* cited by examiner

*Primary Examiner* — Yuwen Pan
*Assistant Examiner* — George Monikang
(74) *Attorney, Agent, or Firm* — Staas & Halsey LLP

(57) ABSTRACT

A method for separating a sound source from a mixed signal, includes Transforming a mixed signal to channel signals in frequency domain; and grouping several frequency bands for each channel signal to form frequency clusters. Further, the method for separating the sound source from the mixed signal includes separating the frequency clusters by applying a blind source separation to signals in frequency domain for each frequency cluster; and integrating the spectrums of the separated signal to restore the sound source in a time domain wherein each of the separated signals expresses one sound source.

13 Claims, 5 Drawing Sheets

METHOD FOR SEPARATING SOURCE SIGNALS AND APPARATUS THEREOF

CROSS-REFERENCE TO RELATED APPLICATIONS

The present invention claims priority of Korean Patent Application No. 10-2008-0131761, filed on Dec. 22, 2008, which is incorporated herein by reference.

FIELD OF THE INVENTION

The present invention relates to a method for separating source signals and apparatus thereof, and more particularly, to a method for separating source signals from a mixed signal in which two or more sound sources are recorded by using two or more microphones.

BACKGROUND OF THE INVENTION

As known in the art, blind source separation is a technology for separating a signal collected from more than two microphones depending on the statistic characteristics of sound sources. The blind source separation is generally classified into a time domain based separation method and a frequency domain based separation method.

In general, the blind source separation performs learning by using an independent component analysis (ICA) method. The ICA method is an algorithm for separating a voice signal only from an input signal in which the voice signal and noise signals are mixed together through a microphone array system on the assumption that each signal source has independent characteristics.

The ICA method is employed to find an inverse matrix of a mixing matrix to find a separation matrix for separating a voice signal from an input signal. In this case, the inverse matrix can be calculated only if the number of sound sources is identical with the number of the mixing matrixes.

As described above, in order to eliminate noise by using the blind source separation, original signals are separated from input signals having voice signals and noise signals by extracting the voice and noise signals that are mutually independent from the input signal. In other words, a mixed signal having a plurality of voice signals and noise signals is received, the voice signals and the noise signals are separated from the mixed signal, and voice recognition is performed only by using the separated voice signals.

However, the time domain-based separation method has following disadvantages although the time domain-based separation method has better performance than the frequency domain-based separation method. That is, the time domain based separation method is significantly influenced by a location of speakers and environmental factors. Also, the algorithm of the time domain based separation method becomes complicated and the computation amount thereof becomes increased in case of separating more than three signals. Meanwhile, the frequency domain-based separation method also has shortcoming such as a serious scrambling problem although the algorithm thereof is very simple to implement and intuitive. It is, therefore, difficult to solve such a scrambling problem of the frequency domain-based separation method.

In order to overcome the scrambling problem, an independent vector analysis method has been introduced. The independent vector analysis (IVA) method separates sound sources by regarding overall frequency bands as one vector. However, the independent vector analysis method has disadvantages of large computation amount and slow convergence.

The ICA method has a limitation that the number of mixed signals input to an input device should be identical with the number of original signal sources and that the number of separated signals is identical with the number of signal sources. Further, it is difficult to detect which of separated signals is related to which of signal sources.

SUMMARY OF THE INVENTION

In view of the above, the present invention provides a method and apparatus for separating sound sources, capable of separating a sound source signal from a mixed signal in which more than two sound source signals and noise signals are mixed together to improve record, transmission, and recognition performance.

In accordance with a first aspect of the present invention, there is provided a method for separating a sound source from a mixed signal, including: transforming a mixed signal to channel signals in frequency domain; grouping several frequency bands for each channel signal to form frequency clusters; separating the frequency clusters by applying a blind source separation to signals in frequency domain for each frequency cluster; and integrating the spectrums of the separated signal to restore the sound source in a time domain wherein each of the separated signals expresses one sound source.

In accordance with a second aspect of the present invention, there is provided an apparatus for separating a sound source from a mixed signal, including: a Fourier transformer for transforming the mixed signal to channel signals in a domain; a frequency band divider for grouping several frequency bands for each channel signal to form frequency clusters; a signal separator for separating the frequency clusters by using a blind source separation to signals in frequency domain for each frequency cluster; and an inverse Fourier transformer for integrating the spectrums of the separated signals to restore the sound source, wherein each of the separated signals expresses one sound source.

The method and apparatus for separating sound sources according to the present invention enables an apparatus receiving various sounds including voice to separate a sound source of a target signal in an environment having a plurality of sound sources. Therefore, record, transmission, and recognition performance can be improved.

Further, the method and apparatus for separating sound sources according to the present invention enable selectively processing only a voice of a target sound source in recording, transmitting, and recognizing a voice in an environment having many people speaking at the same time, such as a conference room, an environment having various sound sources such as a concert hall, or an environment having noises, such as a living room with TV turned on.

The method and apparatus for separating sound sources according to the present invention can precisely separate signals in cluster level by using frequency band clustering, thereby improving separation performance. Also, the method and apparatus for separating sound source according to the present invention can provide high separation performance with less computation and fast convergence by reducing a dimension of input data.

Furthermore, the method and apparatus for separating sound sources according to the present invention provide high separation performance in cluster level by applying a probability distribution function suitable for a signal character of a frequency component in a corresponding cluster to a separation algorithm in order to process one cluster.

The method and apparatus for separating sound sources according to the present invention can restore integrated frequency domain signals to a time domain signal through inverse Fourier transform and solve a channel scrambling problem and a scaling problem which are fundamentally generated in separation in order to integrate independently processed clusters.

BRIEF DESCRIPTION OF THE DRAWINGS

The objects and features of the present invention will become apparent from the following description of an embodiment given in conjunction with the accompanying drawings, in which.

DETAILED DESCRIPTION OF THE EMBODIMENTS

Hereinafter, an embodiment of the present invention will be described in detail with reference to the accompanying drawings, which form a part hereof.

Figure 1:
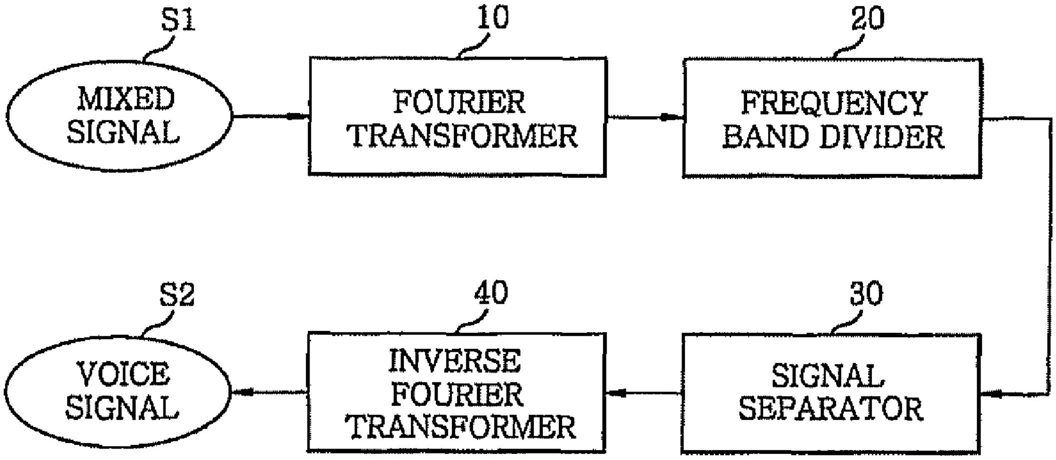
FIG. 1 is a block diagram illustrating a sound source separation apparatus in accordance with an embodiment of the present invention.

FIG. 1 is a block diagram illustrating a sound source separation apparatus in accordance with an embodiment of the present invention. As shown in FIG. 1, a sound source separation apparatus 100 includes a Fourier transformer 10, a frequency band divider 20, a signal separator 30 and an inverse Fourier transformer 40.

The sound source separation apparatus may be applied to an apparatus for recording, transmitting and recognizing sound that receives a mixed signal S1 having a plurality of sound sources and noise. The Fourier transformer 10 transforms the mixed signal S1 into a channel signals in frequency domain based on Fourier Transform and provides the channel signals to the frequency band divider 20.

Figure 2:
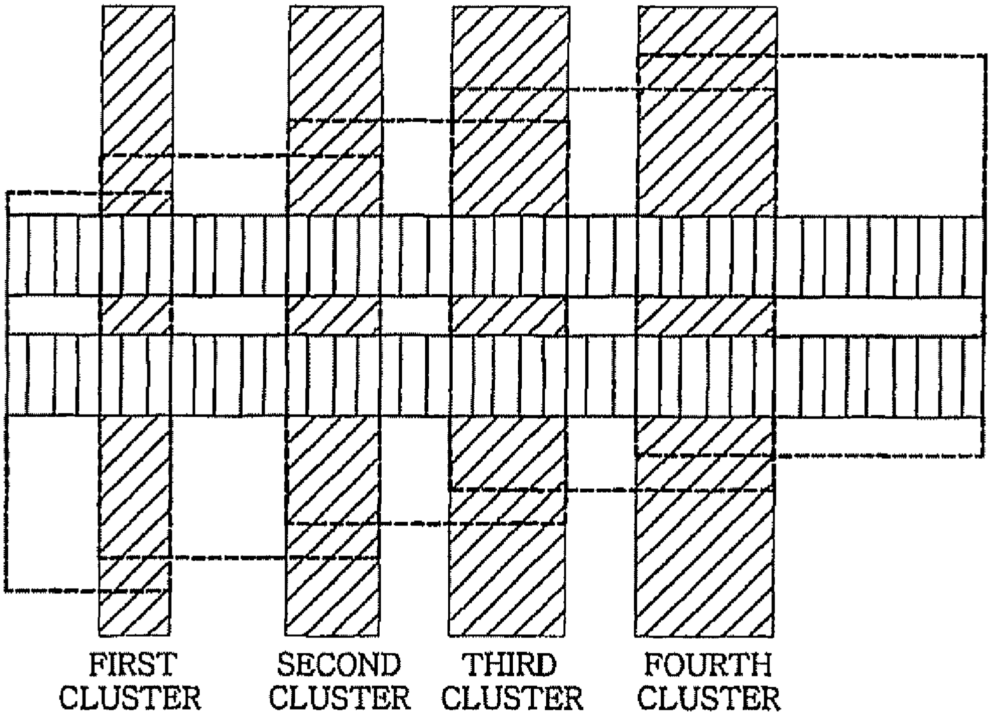
FIG. 2 is a diagram for describing dividing a frequency domain to clusters by arranging an overlap region in accordance with the embodiment of the present invention.

Here, the frequency band divider 20 may arrange a predetermined overlap region between clusters when the frequency clusters are formed. For example, FIG. 2 shows the overlap regions of first, second, third, and fourth clusters. Such overlap regions are used to solve the scaling problem when a signal is restored after signal separation. Such a process may employ, for example, clustering of Mel scaling, which has been widely used for voice recognition and voice signal processing. The number of clusters can be selected by a user. That is, the Mel scaling is non-linear scaling including a narrow region in a low frequency band and a wide region in a high frequency band. The Mel scaling has been widely used.

The frequency band divider 20 forms a frequency cluster by grouping several frequency bands of the channel signals in the frequency domain from the Fourier transformer 10 to express a signal character of a frequency band as a probability distribution function. The frequency band divider 20 provides the frequency cluster to the signal separator 30.

The frequency cluster formed by the frequency band divider 20 is an M-dimensional vector. The signal separator 30 employs blind source separation to separate signals in frequency domains of each cluster having the M-dimension vector as an input.

The blind source separation for the frequency domains of each cluster may use an IVA as a function for measuring statistical likelihood between signals Wherein the IVA has a vector as an input. Here, the IVA technology learns a separation filter to independently express each separated signal as independent probability distribution function on the assumption that a vector of each sound source, which expresses an overall frequency component of a sound source signal, is independent from a vector of other sound source.

That is, the signal separator 30 uses an independent separation filter to learn the signals in frequency domains for each frequency cluster. The probability distribution function is differently set to each cluster to reflect the characteristic of each cluster.

The probability distribution function of a signal $s_i$ can be calculated by using the following Equation. 1

$$f_{si}(s_i) = \exp\left(-\frac{1}{\sigma}\sqrt{\sum_{f=1}^{F}|s_i^f|^2}\right) \quad \text{[Equation 1]}$$

In the Equation. 1, $s_i$ indicates $i_{th}$ channel signal, f means frequency, and $s_i^f$ indicates component of frequency f in the $i_{th}$ channel signal. Also, σ denotes signal dispersion.

When the blind source separation is independently applied to each cluster, the probability distribution function of a signal of each cluster can be calculated by the following Equation. 2.

$$f_{si,c}(s_{i,c}) = \exp\left(-\frac{1}{\sigma_c}\sqrt{\sum_{f=F_{min,c}}^{F_{max,c}}|s_{i,c}^f|^2}\right) \quad \text{[Equation 2]}$$

Figure 3:
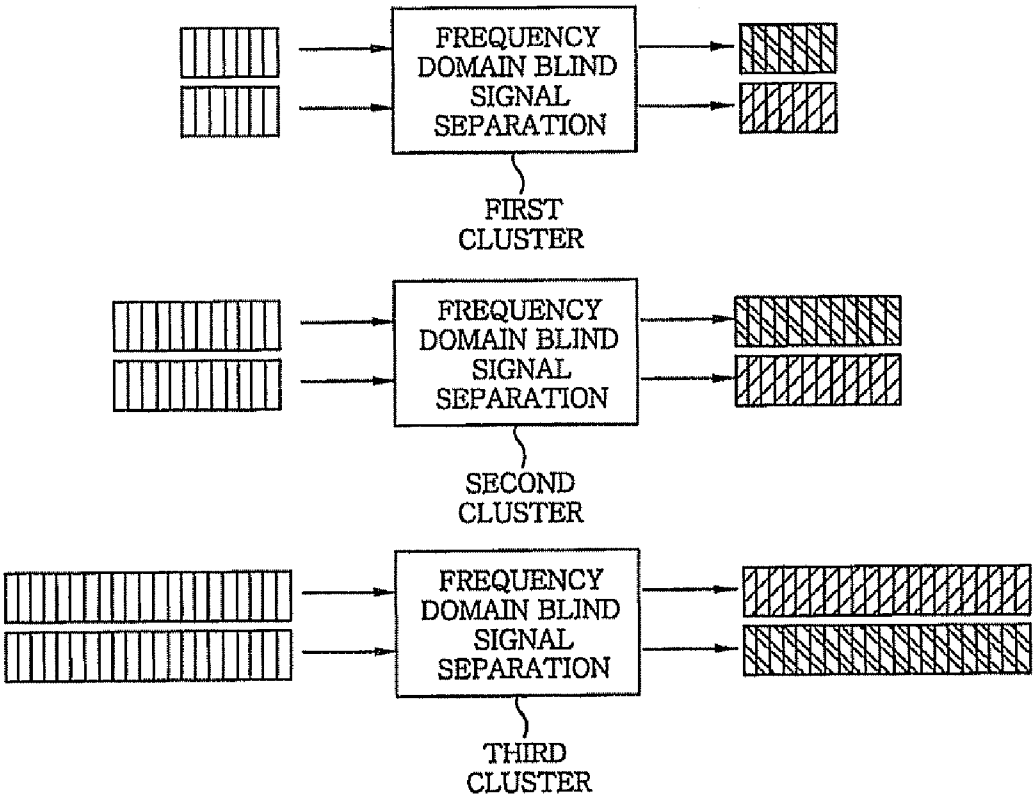
FIG. 3 is a diagram for describing independently applying a blind source separation technology to each cluster in accordance with the embodiment of the present invention.

In the Equation. 2, c denotes a cluster index, $F_{min,c}$ indicates a minimum frequency index included in a cluster c, $F_{max,c}$ indicates the maximum frequency index, and $\sigma_c$ indicates the dispersion of a cluster c. $\sigma_c$ can be set differently to each cluster according to the characteristics of the sound source. For example, as shown in FIG. 3, $\sigma_c$ can be set differently for a first cluster, a second cluster and a third cluster. In case of a voice signal, a low value is assigned to a cluster including a low frequency band (e.g., the first cluster) while a high value is assigned to a cluster including a high frequency band (e.g., the second cluster).

When the blind source separation technology is independently applied to signals in frequency domains of each cluster, a signal in a frequency domain of each cluster is the spectrum of a separated signal that expresses one sound source for each channel. However, a channel size becomes different from an original sound source due to the fundamental limitation of the blind source separation technology. Consequently, a channel scrambling problem is generated and a scaling problem is also generated because scaling is differently applied to each cluster due to the fundamental limitation of the blind source separation technology. Therefore, the signal separator 30 processes the signals in the frequency domains of each cluster by solving the channel scrambling problem and the scaling problem and provides the processed signal to the inverse Fourier transformer 40.

Figure 4:
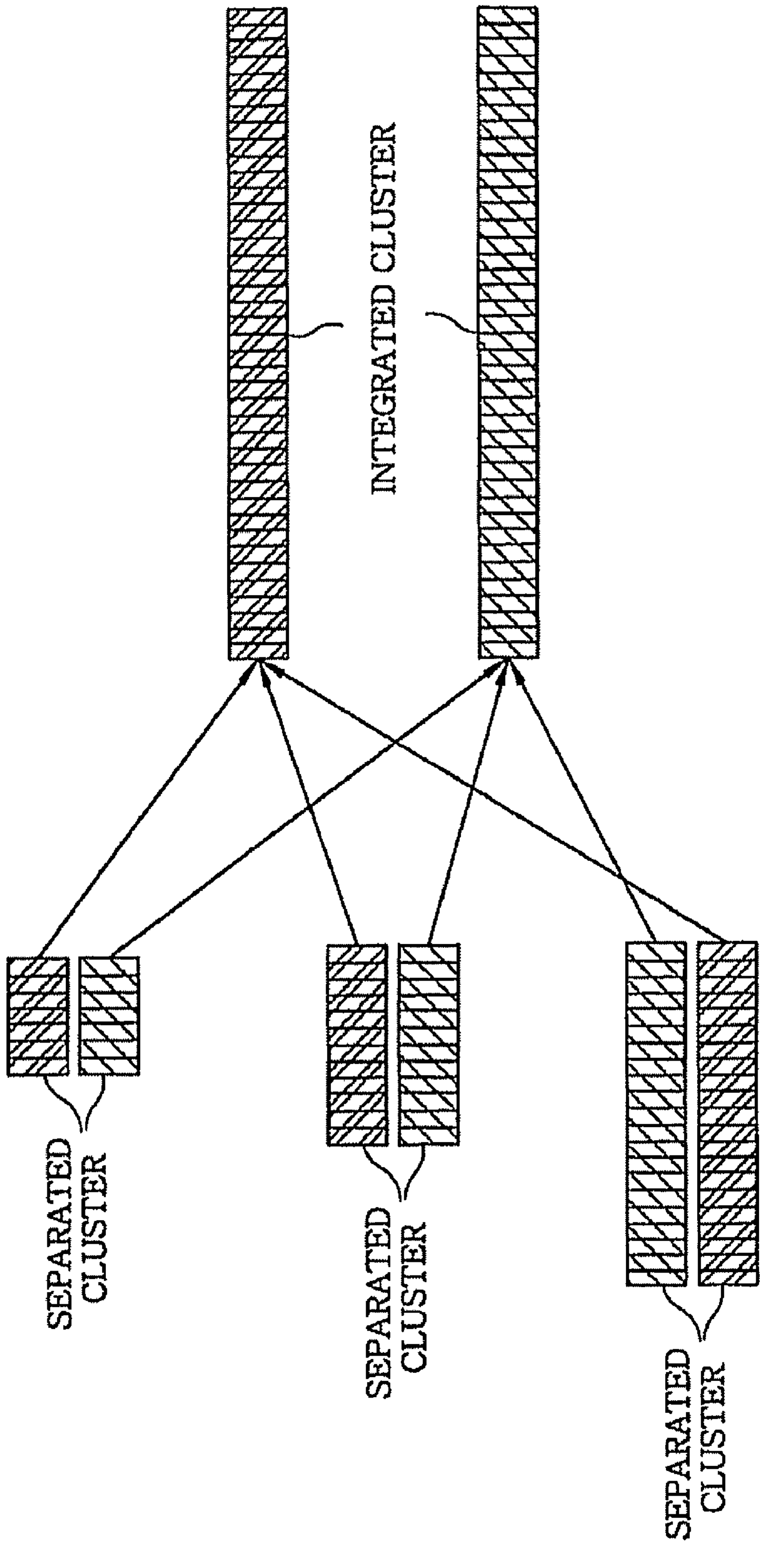
FIG. 4 is a diagram for describing integrating separated signal after independently applying a blind source separation technology to separated clusters in accordance with an embodiment of the present invention.
Figure 5:
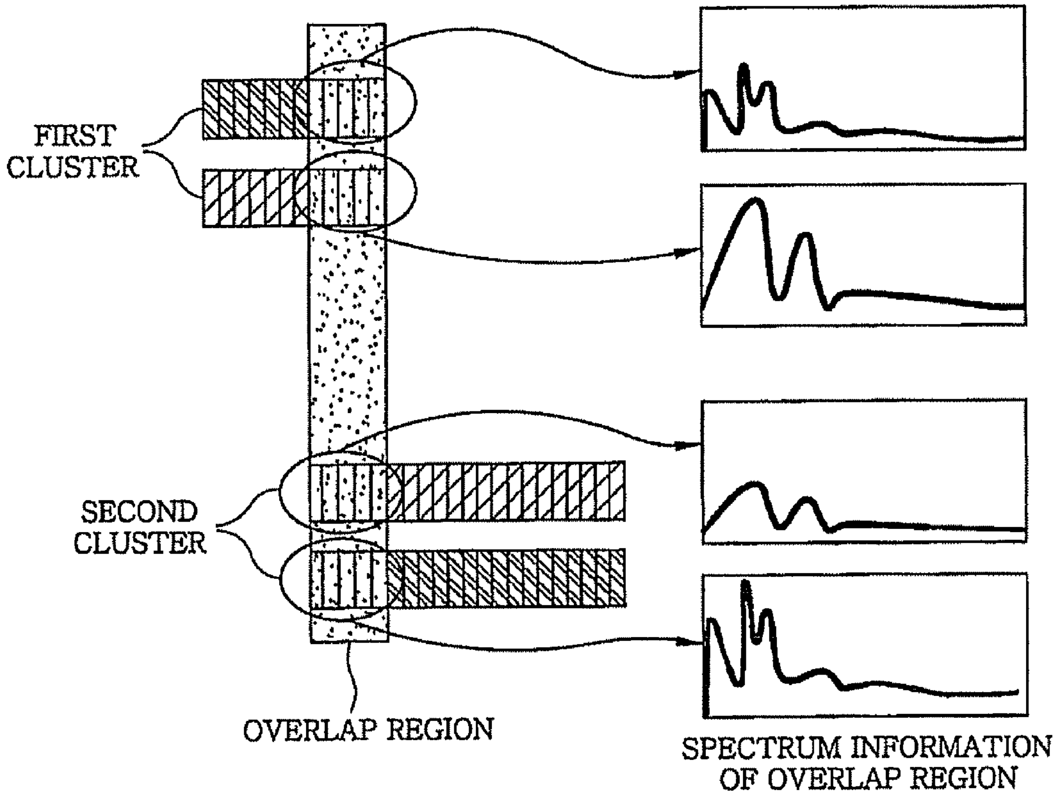
FIG. 5 is a diagram for describing solving a channel scrambling problem and a scaling problem by using overlap region information in integrating separated signals in accordance with the embodiment of the present invention.

The channel scrambling problem is generated due to the fundamental limitation of the blind source separation technology when the blind source separation technology is independently applied to each frequency domain of each cluster. In order to solve the channel scrambling problem, it is required to know that each cluster belongs to which sound source component during integrating again a plurality of clusters after the plurality of clusters are separated. The signal separator 30 uses the overlap region arranged while clusters are divided. Specifically, if two clusters have the same sound source information, the frequency characteristics of the overlap region may be the same. The clusters may be integrated by comparing frequency characteristics of overlap regions of clusters and regarding two clusters having high likelihood of overlap region as one sound source as shown in FIG. 4. Also, the channel scrambling problem may be solved by determining each cluster belongs to which as shown in FIG. 5.

In this regard, the likelihood of overlap region may be compared based on spectrum shape. For example, the output of each cluster is standardized and an Euclidean distance thereof is measured. The likelihood is determined as high if the Euclidean distance is short.

Further, scaling is differently applied to each cluster due to the fundamental limitation of the blind source separation technology when the blind source separation technology is independently applied to each frequency domain of each cluster. The signal separator 30 uses the size information of the overlap region for solving the scaling problem. The signal separator 30 controls scaling of two clusters to have the same energy in overlap region by arranging a predetermined overlap region between two clusters as shown in FIG. 4. Therefore, the signal separator 30 can solve the scaling problem as shown in FIG. 5.

The inverse Fourier transformer 40 integrates the spectrum of separated signals each of which expresses one sound source for each channel to restore a voice signal S2 in a time domain.

In the present invention, it is possible can separate a signal of target sound source in an environment having a plurality of sound sources at the same time, thereby effectively processing recording, and it is possible to selectively process a voice of target sound source for recording, transmitting, and recognizing in an environment where many people chat to each others such as a conference room, an environment having various sound sources such as concert hall, and an environment having noise such as a living with TV turned on.

Figure 6:
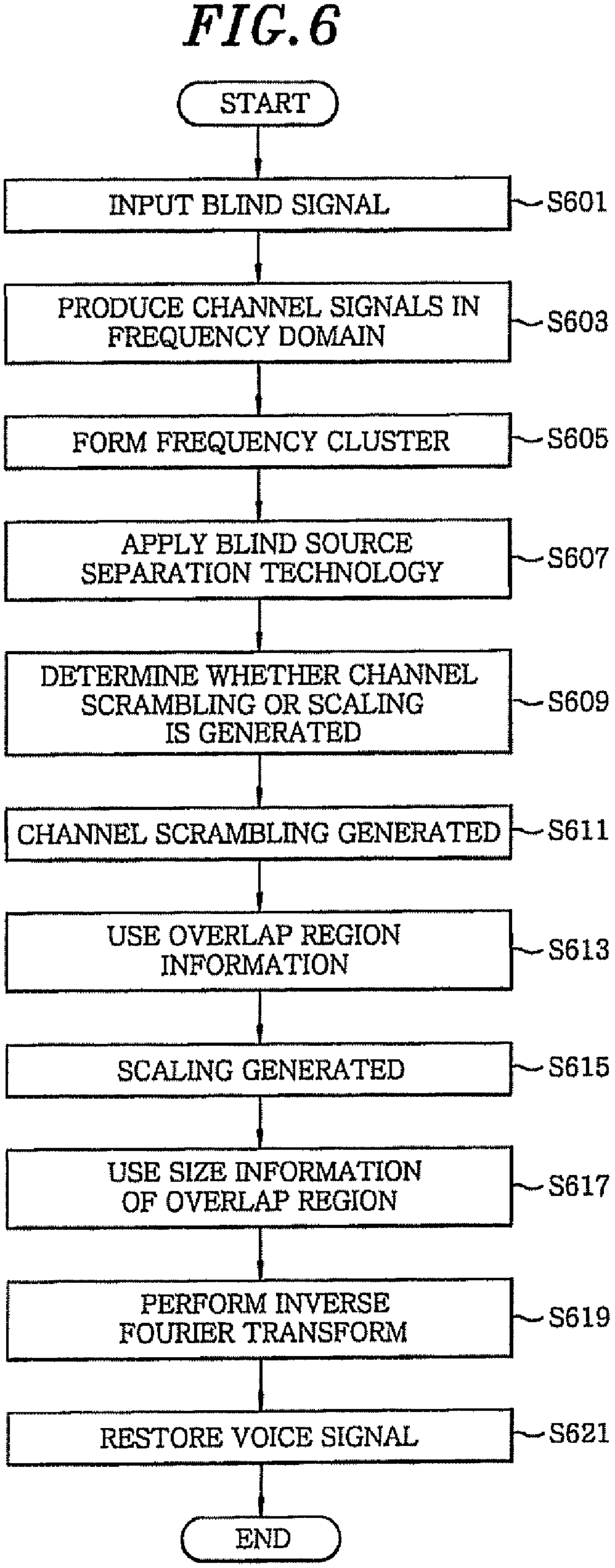
FIG. 6 is a flowchart sequentially illustrating a method for separating sound sources in accordance with the embodiment of the present invention.

FIG. 6 is a flowchart sequentially illustrating a sound source separation method in accordance with the embodiment of the present invention.

In step S601, a mixed signal having a plurality of sound sources and noise signals is inputted to a Fourier transformer 10.

In step S603, the Fourier transformer 10 performs Fourier transform with respect to the mixed signal S1 to produce signals in frequency domains by using Fourier Transform and provides the channel signals in frequency domains to the frequency band divider 20.

In step S605, the frequency band divider 20 groups several frequency bands for each channel signal in the frequency domain to form frequency clusters. That is, the frequency band divider 20 forms the frequency cluster to express signal character in the frequency band as a probability distribution function. Then, the frequency clusters are provided to the signal separator 30.

In step S607, the signal separator 30 applies the blind source separation technology independently to the channel signals in frequency domain of each cluster.

In step S609, the signal separator 30 determines whether a channel scrambling problem is generated or whether a scaling problem is generated.

In step S613, the signal separator 30 uses the overlap region information generated in a cluster separation process if the signal separator 30 determines that the channel scrambling is generated in the step S611. That is, the signal separator 30 solves the scrambling problem by comparing clusters in frequency characters of overlap regions, regarding two clusters having high likelihood of overlap region as one sound source, and integrating the two clusters. Then, the signal separator 30 provides the separated signal to the inverse Fourier transformer 40.

In step S617, the signal separator 30 uses size information of overlap region if the signal separator 30 determines that the scaling problem occurs with the channel scrambling problem in step S615. That is, the signal separator 30 solves the scaling problem by controlling scaling of two clusters to have the same energy of overlap regions by arranging a predetermined overlap region between two clusters, as shown in FIG. 5. Then, the signal separator 30 provides the separated signal to the inverse Fourier transformer 40.

The inverse Fourier transformer 40 integrates spectrums of the separated signals, each of which expresses one sound source and restores the voice signal S2 in a time domain in step S621.

While the invention has been shown and described with respect to the embodiment, it will be understood by those skilled in the art that various changes and modifications may be made without departing from the scope of the invention as defined in the following claims.

What is claimed is:

1. A method for separating a sound source from a mixed signal, comprising:

transforming a mixed signal to channel signals in frequency domain;

grouping several frequency bands for each channel signal to form frequency clusters;

separating the frequency clusters by applying a blind source separation to signals in frequency domain for each frequency cluster; and integrating the spectrums of the separated signal to restore the sound source in a time domain wherein each of the separated signals expresses one sound source, wherein said separating the frequency cluster includes:

determining whether or not a channel scrambling problem or a scaling problem is generated in the frequency domain of each cluster;

eliminating the channel scrambling problem, when the channel scrambling problem is generated, by comparing frequency characters of an overlap region in each cluster in said separating the frequency cluster, regarding two clusters having comparatively high likelihood of the overlap region as one sound source, and integrating the two clusters;

eliminating the generated scaling problem, when the scaling problem is generated, by arranging an overlap region between two clusters in said separating the frequency cluster and controlling scaling of the two cluster to have same energy of the overlap region.

2. The method of claim 1, wherein the likelihood of the overlap region is determined by measuring an Euclidean distance after standardizing output of the each cluster, and the likelihood of the overlap region is determined as high when the measured Euclidean distance is short.

3. The method of claim 1, wherein the blind source separation technology uses an independent vector analysis (IVA) technology which is a function receiving a vector as input.

4. The method of claim 3, wherein the IVA technology learns a separation filter to express a separated signal as an independent probability distribution function when a vector is independent from each sound source for overall frequency components of a sound source signal.

5. The method of claim 4, wherein the probability distribution function is set differently to each cluster to reflect character of the each cluster.

6. The method of claim 4, wherein statistic characteristics of the probability distribution function is calculated by an equation:

$$f_{si}(s_i) = \exp\left(-\frac{1}{\sigma}\sqrt{\sum_{f=1}^{F}|s_i^f|^2}\right),$$

where $s_i$ indicates a $i_{th}$ channel signal, f indicates frequency, $S_i^f$ indicates component of frequency f in a $i_{th}$ channel signal, and σ denotes signal dispersion.

7. The method of claim 4, wherein when blind source separation technology is independently applied to a signal corresponding to each cluster, the probability distribution function is calculated by an equation:

$$f_{si,c}(s_{i,c}) = \exp\left(-\frac{1}{\sigma_c}\sqrt{\sum_{f=F_{min,c}}^{F_{max,c}}|s_{i,c}^f|^2}\right),$$

where c denotes a cluster index, $F_{min,c}$ indicates a minimum frequency index included in a cluster c, $F_{max,c}$ indicates the maximum frequency index, and $\sigma_c$ indicates the dispersion of a cluster c, and where $\sigma_c$ is differently set to each cluster according to the characteristics of the sound source.

8. An apparatus for separating a sound source from a mixed signal, comprising:

a Fourier transformer for transforming the mixed signal to channel signals in a domain;

a frequency band divider for grouping several frequency bands for each channel signal to form frequency clusters;

a signal separator for separating the frequency clusters by using a blind source separation to signals in frequency domain for each frequency cluster; and an inverse Fourier transformer for integrating the spectrums of the separated signals to restore the sound source, wherein each of the separated signals expresses one sound source, wherein the signal separator compares frequency characteristics of an overlap region of each cluster in a cluster division process, regards two clusters having relatively high likelihood of the overlap region as one sound source, and integrates the two clusters to thereby eliminate a channel scrambling generated in the frequency domain for each frequency cluster.

9. The apparatus of claim 8, wherein the likelihood of the overlap region is determined by measuring an Euclidean distance after standardizing output of the each cluster, and the likelihood of the overlap region is determined as high when the measured Euclidean distance is short.

10. The apparatus of claim 8, wherein the blind source separation uses an independent vector analysis (IVA) technology which is a function receiving a vector as input.

11. The apparatus of claim 10, wherein the IVA technology learns a separation filter to express a separated signal as an independent probability distribution function when a vector is independent from each sound source for overall frequency components of a sound source signal.

12. The apparatus of claim 11, wherein the probability distribution function is set differently to each frequency cluster to reflect character of the each cluster.

13. The apparatus of claim 8, wherein a frequency cluster for the each channel signal is formed by applying clustering of Mel scale.

* * * * *